United States Patent [19]

Watanabe et al.

[11] Patent Number: 5,143,869
[45] Date of Patent: Sep. 1, 1992

[54] BORIDE-ZIRCONIUM OXIDE-NITROGEN CARBIDE-BASED CERAMICS

[75] Inventors: Tadahiko Watanabe; Kazuhisa Shobu, both of Tosu, Japan

[73] Assignee: Agency of Industrial Science and Technology, Tokyo, Japan

[21] Appl. No.: 716,928

[22] Filed: Jun. 18, 1991

[30] Foreign Application Priority Data

Jun. 18, 1990 [JP] Japan ................... 2-160842

[51] Int. Cl.$^5$ .................. C04B 35/56; C04B 35/58
[52] U.S. Cl. ..................... 501/87; 501/96; 501/103
[58] Field of Search ............ 501/87, 96, 103

[56] References Cited

U.S. PATENT DOCUMENTS 4,492,764  1/1985  Watanabe et al. ............ 501/87
4,598,053  7/1986  Yamakawa et al. .......... 501/96 X
4,889,836  12/1989  Buljan et al. ................. 501/98 X
4,933,308  6/1990  Nishio et al. ................. 501/87 X

FOREIGN PATENT DOCUMENTS 59-7668  2/1984  Japan.
59-7669  2/1984  Japan.

*Primary Examiner*—Karl Group
*Attorney, Agent, or Firm*—Oblon, Spivak, McClelland, Maier & Neustadt

[57] ABSTRACT

Metallic boride-based ceramics having mechanical properties suited for use in extensive applications as abrasion-resistant and cutting tools are prepared by sintering a mixture essentially consisting of 20 to 88% by weight of one or more metallic borides and 10 to 70% by weight of a powder of zirconium oxide, with 2 to 70% by weight of one or more cubic nitrogen carbides selected from the group of Ti(C, N) and Zr(C, N).

6 Claims, No Drawings

BORIDE-ZIRCONIUM OXIDE-NITROGEN CARBIDE-BASED CERAMICS

FIELD OF THE INVENTION

This invention relates to a new type of metallic-boride-based sintered ceramics of high density suited for use as abrasion-resistant and cutting tool materials, and more particularly to boride-zirconium oxide-nitrogen carbide-based sintered ceramics.

BACKGROUND OF THE INVENTION

The inventors have proposed ceramics prepared by sintering a matrix of titanium diboride with the addition of zirconium dioxide ($ZrO_2$) (Japanese Patent Publication No. 7668 of 1984) and sintered ceramics prepared with the addition of cubic carbide (Japanese Patent Publication No. 7669 of 1984). These ceramics are suited for use as abrasion-resistant materials that are required to have considerable toughness. With the marked progress of industry in recent years, there are increasing demands for ceramics that are easier to sinter and have more improved properties.

Therefore, the inventors are continuing studies on the further improvement of the properties of metallic boride-zirconium oxide-metallic carbide-based ceramics.

When zirconium dioxide is added for the improvement of toughness, in particular, the zirconium dioxide stabilizer used together causes thermal deterioration. As such, composite ceramics sintered with zirconium dioxide stabilized by yttrium oxide ($Y_2O_3$) or other similar stabilizer have been used only for services involving not much higher temperatures than the room temperature.

DESCRIPTION OF THE PREFERRED EMBODIMENTS

Through the studies to improve the sinterability and mechanical properties of metallic boride-zirconium oxide-carbide-based ceramics, the inventors discovered that the use of nitrogen carbide, which is a compound of metallic carbide and a solid solution of nitrogen, in place of metallic carbide permits lowering the sintering temperature while increasing deflective strength and toughness. It was also discovered that the use of monoclinic zirconium as zirconium oxide permits further improvement of thermal properties. These discoveries have resulted in this invention.

Generally, powders of borides tend to contain oxygen, and those containing oxygen are difficult to compact. Metallic carbide has a function to form a solid solution of the oxygen and removes it from the powders of borides. Metallic nitrogen carbide too was considered to have a similar property and high abrasion resistance against steel. After repeating sintering tests based on the above assumption, it was confirmed that metallic nitrogen carbide produces satisfactory results under certain conditions.

An object of this invention, which is based on the above knowledge, is to provide metallic boride-based ceramics having such mechanical properties as are suited for extensive applications as abrasion-resistant and cutting tools.

Another object of this invention is to provide metallic boride-based ceramics having such mechanical properties as are suited for extensive applications as abrasion-resistant and cutting tools that are heated to 200° C. or above.

This invention relates to metallic boride-based ceramics essentially consisting of a mixed powder of (A) 20 to 88% by weight, of the total weight of the mixture, of one or more of metallic borides expressed as $MB_2$ and $M_2B_5$ (M denotes metal), (B) 10 to 70% by weight of zirconium dioxide ($ZrO_2$), and (C) 2 to 70% by weight of one or more of Ti(C, N) and Zr(C,N).

The main constituent (A) is a metallic boride selected from a group of such diborides as $TiB_2$, $ZrB_2$, $CrB_2$, $VB_2$, $TaB_2$, $NbB_2$, $MnB_2$, $MoB_2$, $HfB_2$, $YB_2$, $AlB_2$ and $MgB_2$ and such borides as $W_2B_5$ and $Mo_2B_5$ in which five atoms of metal combine with two atoms of boron. These borides may be used either singly or in combination.

The constituent (B) may be one or two of zirconium dioxides selected from a group of partially stabilized $ZrO_2$, tetragonal $ZrO_2$, cubic $ZrO_2$ and monoclinic $ZrO_2$. Addition of $ZrO_2$ should preferably be kept within the range of 10 to 70% by weight. In particular, addition of monoclinic $ZrO_2$, preferably within the range of 10 to 50% by weight, remarkably improves thermal properties with no deterioration resulting when heated at 250° C. for 200 hours. Adequate mechanical strength is not obtained outside the above range.

The cubic nitrogen carbide added as a third constituent is one or both of Ti(C, N) and Zr(C, N). This nitrogen carbide must constitute 2 to 70% by weight of the mixture. Outside this range, sintering and the improvement of the mechanical properties of the obtained sinter become difficult. When monoclinic $ZrO_2$ is used, Ti(C, N) should be preferably used as cubic nitrogen carbide.

Nitrogen carbide provides higher abrasion-resistance against steel than carbide, as mentioned previously. With some nitrogen removed during sintering, the solid solution of oxygen is formed with greater ease, which permits further improvement of properties.

When partially stabilized, tetragonal, cubic or monoclinic $ZrO_2$ is used, a compact sinter is obtained by forming an agglomerated mixture of the materials with a metal mold or rubber press and heating the formed product in a vacuum or in an atmosphere of inert, reducing, nitrogen or other gas at a temperature of 1400° to 1900° C. for 60 to 200 minutes. When monoclinic $ZrO_2$ is used, heating at 1400° to 1700° C. for 30 to 120 minutes is sufficient. The sinter may further be processed by hot isostatic pressing (HIP) or hot-pressing may be applied instead of vacuum sintering.

The metallic boride-based ceramics thus obtained are suited as materials for abrasion-resistant and cutting tools.

EXAMPLE 1

$TiB_2$ and Ti(C, N) classified to a particle size of not larger than 4 μm and partially stabilized $ZrO_2$ having a particle size of 0.02 μm were mixed in the ratio of 30:30:40 by weight. The mixture was agglomerated and formed with a rubber press under a pressure of 3 tons/cm$^2$ and then vacuum-sintered at 1700° C. for 90 minutes. The obtained sinter proved to have a deflective strength of 90 kg/mm$^2$, a Vickers hardness of Hv 1500, and a $K_{IC}$ value of 6 MPam$^{\frac{1}{2}}$ determined by the indentation method. Observation of the texture revealed no voids. This example is shown at No. 1 in Table 1. The specimens sintered by the same method and their properties are shown at Nos. 1 to 4 and 6 to 8.

EXAMPLE 2

TiB$_2$ and Ti(C, N) classified to a particle size of not larger than 4 μm and partially stabilized ZrO$_2$ having a particle size of 0.02 μm were mixed in the ratio of 30:30:40 by weight. The mixture was filled in a graphite mold and hot-pressed in a vacuum with a die pressure of 200 kg/cm$^2$ at 1700° C. for 60 minutes. The obtained sinter proved to have a deflective strength of 90 kg/mm$^2$, a Vickers hardness of Hv 1700, and a K$_{IC}$ value of 4 MPam$^{\frac{1}{2}}$ determined by the indentation method. Observation of the texture revealed no voids. This example is shown at No. 5 in Table 1. The specimens tested by the same method are shown at Nos. 9 and 10. The ZrO$_2$ used in the test was partially stabilized. Nos. 11 to 13 show the specimens tested for comparison. Generally, hot-pressed sinters are more compact, stronger and harder than vacuum-sintered products.

EXAMPLE 3

TiB$_2$ and Ti(C, N) classified to a particle size of not larger than 4 μm and monoclinic ZrO$_2$ were mixed in the ratio of 30:30:40 by weight. The mixed powder was hot-pressed in a vacuum at 1600° C. for 60 minutes. The obtained sinter proved to have a deflective strength of 700 MPa, a Vickers hardness of Hv 1650, and K$_{IC}$ value of 7.5 MPam$^{\frac{1}{2}}$ determined by the indentation method. The specimen developed no crack when heated at 250° C. for 300 hours in the atmosphere.

Table 2 shows other specimens prepared with the addition of monoclinic ZrO$_2$. The specimens with an asterisk were tested for the purpose of comparison.

TABLE 1

| Specimen No. | Chemical Composition (% by weight) | Sintering Temperature (°C.) | Sintering Time (Min.) | Atmosphere |
|---|---|---|---|---|
| 1. | 30% TiB$_2$—40% ZrO$_2$—30% Ti(C, N) | 1700 | 90 | Vacuum |
| 2. | 30% TiB$_2$—40% ZrO$_2$—30% Ti(C, N) | 1800 | 90 | Vacuum |
| 3. | 30% TiB$_2$—10% ZrO$_2$—60% Ti(C, N) | 1800 | 90 | Vacuum |
| 4. | 15% TiB$_2$—10% ZrO$_2$—75% Ti(C, N) | 1800 | 90 | Vacuum |
| 5. | 30% TiB$_2$—40% ZrO$_2$—30% Ti(C, N) | 1700 | 60 | Vacuum |
| 6. | 29% TiB$_2$—70% ZrO$_2$—1% Ti(C, N) | 1800 | 90 | Vacuum |
| 7. | 28.5% TiB$_2$—1.5% TaB$_2$—40% ZrO$_2$—30% Ti(C, N) | 1600 | 90 | Vacuum |
| 8. | 5% TiB$_2$—20% ZrB$_2$—40% ZrO$_2$—35% Ti(C, N) | 1600 | 90 | Vacuum |
| 9. | 20% ZrB$_2$—50% ZrO$_2$—30% Zr(C, N) | 1700 | 60 | Vacuum |
| 10. | 20% CrB$_2$—50% ZrO$_2$—30% Ti(C, N) | 1700 | 60 | Vacuum |
| 11. | TiB$_2$—40% ZrO$_2$ | 1800 | 60 | Vacuum |
| 12. | TiB$_2$—40% ZrO$_2$—30% TiC | 1800 | 60 | Vacuum |
| 13. | 27% TiB$_2$—70% ZrO$_2$—3% Ti(C, N) | 1600 | 60 | Vacuum |

| Specimen No. | Chemical Composition (% by weight) | Deflective strength (Kg/mm$^2$) | Hardness at room temperature | K$_{IC}$ MPam$^{\frac{1}{2}}$ | Void in texture | Remarks |
|---|---|---|---|---|---|---|
| 1. | 30% TiB$_2$—40% ZrO$_2$—30% Ti(C, N) | 90 | 1500 | 6 | None | Vacuum sintering |
| 2. | 30% TiB$_2$—40% ZrO$_2$—30% Ti(C, N) | 90 | 1800 | 5 | None | Vacuum sintering |
| 3. | 30% TiB$_2$—10% ZrO$_2$—60% Ti(C, N) | 60 | 1900 | 4 | None | Vacuum sintering |
| 4. | 15% TiB$_2$—10% ZrO$_2$—75% Ti(C, N) | 60 | 1900 | 4 | None | Vacuum sintering |
| 5. | 30% TiB$_2$—40% ZrO$_2$—30% Ti(C, N) | 90 | 1700 | 4 | None | Hot pressing |
| 6. | 29% TiB$_2$—70% ZrO$_2$—1% Ti(C, N) | 20 | 900 | 8 | None | Vacuum sintering |
| 7. | 28.5% TiB$_2$—1.5% TaB$_2$—40% ZrO$_2$—30% Ti(C, N) | 100 | 1700 | 6 | None | Vacuum sintering |
| 8. | 5% TiB$_2$—20% ZrB$_2$—40% ZrO$_2$—35% Ti(C, N) | 100 | 1700 | 6 | None | Vacuum sintering |
| 9. | 20% ZrB$_2$—50% ZrO$_2$—30% Zr(C, N) | 90 | 1700 | 6 | None | Hot pressing |
| 10. | 20% CrB$_2$—50% ZrO$_2$—30% Ti(C, N) | 90 | 1700 | 6 | None | Hot pressing |
| 11. | TiB$_2$—40% ZrO$_2$ | 50 | 1500 | 4 | None | Hot pressing |
| 12. | TiB$_2$—40% ZrO$_2$—30% TiC | 70 | 1700 | 4 | None | Hot pressing |
| 13. | 27% TiB$_2$—70% ZrO$_2$—3% Ti(C, N) | 80 | 1600 | 10 | None | Hot pressing |

TABLE 2

| Specimen No. | Chemical Composition (% by weight) | Sintering Temperature (°C.) | Sintering Time (Min.) | Atmosphere | Deflective strength (MPa) | Hardness at room temperature | K$_{IC}$ MPam$^{\frac{1}{2}}$ | Void in texture | Remarks |
|---|---|---|---|---|---|---|---|---|---|
| 1.* | 30% TiB$_2$—70% Ti(C, N) | 1800 | 60 | Vacuum | 800 | 2100 | 3.5 | None | Hot pressing |
| 2. | 30% TiB$_2$—10% ZrO$_2$—60% Ti(C, N) | 1600 | 60 | Vacuum | 1200 | 1950 | 4.5 | None | Hot pressing |

TABLE 2-continued

| Specimen No. | Chemical Composition (% by weight) | Sintering Conditions | | | Properties of Sinter | | | | Remarks |
|---|---|---|---|---|---|---|---|---|---|
| | | Sintering Temperature (°C.) | Sintering Time (Min.) | Atmosphere | Deflective strength (MPa) | Hardness at room temperature | $K_{IC}$ MPam$^{\frac{1}{2}}$ | Void in texture | |
| 3. | 30% TiB$_2$—20% ZrO$_2$—50% Ti(C, N) | 1600 | 60 | Vacuum | 800 | 1800 | 5.5 | None | Hot pressing |
| 4. | 30% TiB$_2$—30% ZrO$_2$—40% Ti(C, N) | 1600 | 60 | Vacuum | 800 | 1700 | 7.5 | None | Hot pressing |
| 5. | 30% TiB$_2$—40% ZrO$_2$—30% Ti(C, N) | 1600 | 60 | Vacuum | 700 | 1600 | 6.5 | None | Hot pressing |
| 6. | 30% TiB$_2$—50% ZrO$_2$—20% Ti(C, N) | 1600 | 60 | Vacuum | 700 | 1500 | 6.0 | None | Hot pressing |
| 7.* | 30% TiB$_2$—70% ZrO$_2$ | 2000 | 60 | Vacuum | 400 | — | — | Present | Hot pressing |
| 8.* | 30% TiB$_2$—40% ZrO$_2$—30% TiC | 2000 | 60 | Vacuum | 700 | 1700 | 4.0 | None | Hot pressing |
| 9.* | 50% TiB$_2$—50% Ti(C, N) | 1800 | 60 | Vacuum | 800 | 2200 | 3.5 | None | Hot pressing |
| 10. | 50% TiB$_2$—10% ZrO$_2$—40% Ti(C, N) | 1600 | 60 | Vacuum | 1000 | 2000 | 4.5 | None | Hot pressing |
| 11. | 50% TiB$_2$—20% ZrO$_2$—30% Ti(C, N) | 1600 | 60 | Vacuum | 800 | 1800 | 5.5 | None | Hot pressing |
| 12. | 50% TiB$_2$—30% ZrO$_2$—20% Ti(C, N) | 1600 | 60 | Vacuum | 800 | 1700 | 7.0 | None | Hot pressing |
| 13. | 50% TiB$_2$—40% ZrO$_2$—10% Ti(C, N) | 1600 | 60 | Vacuum | 850 | 1600 | 8.0 | None | Hot pressing |
| 14.* | 50% TiB$_2$—50% ZrO$_2$ | 2000 | 60 | Vacuum | 500 | — | — | None | Hot pressing |
| 15. | 30% TiB$_2$—30% ZrO$_2$—40% Zr(C, N) | 1600 | 60 | Vacuum | 900 | 1700 | 7.0 | None | Hot pressing |
| 16. | 30% CrB$_2$—30% ZrO$_2$—40% Ti(C, N) | 1600 | 60 | Vacuum | 800 | 1700 | 7.0 | None | Hot pressing |
| 17. | 30% MoB—30% ZrO$_2$—40% Ti(C, N) | 1600 | 60 | Vacuum | 700 | 1700 | 7.0 | None | Hot pressing |
| 18 | 30% FeB—30% ZrO$_2$—40% Ti(C, N) | 1600 | 60 | Vacuum | 800 | 1600 | 7.0 | None | Hot pressing |

What is claimed is:

1. Boride-zirconium oxide-nitrogen carbide-based ceramics prepared by sintering a mixture consisting essentially of 20 to 88% by weight of one or more metallic borides and 10 to 70% by weight of a powder of zirconium oxide, with 2 to 70% by weight of one or more cubic nitrogen carbides selected from the group consisting of Ti(C, N) and Zr(C, N).

2. Boride-zirconium oxide-nitrogen carbide-based ceramics according to claim 1, in which the powder of zirconium oxide consists of a powder of one or more zirconium oxides selected from the group consisting of tetragonal, cubic and monoclinic zirconium oxides.

3. Boride-zirconium oxide-nitrogen carbide-based ceramics according to claim 1, in which the powder of zirconium oxide consists of a powder of monoclinic zirconium oxide.

4. Boride-zirconium oxide-nitrogen carbide-based ceramics according to claim 3, in which 10 to 50% by weight of monoclinic zirconium oxide is mixed.

5. Boride-zirconium oxide-nitrogen carbide-based ceramics according to claim 4, in which Ti(C, N) is used as the nitrogen carbide.

6. Boride-zirconium oxide-nitrogen carbide-based ceramics according to any of claims 1 to 5, in which a compound consisting of one atom of metal combined with two atoms of boron or a compound consisting of five atoms of metal combined with two atoms of boron is used as the metallic boride.

* * * * *